Patented Sept. 17, 1940

2,214,934

UNITED STATES PATENT OFFICE 2,214,934

VULCANIZED POLYMERIZED CHLOROPRENE

Emil Ott, Elsmere, Del., assignor to Hercules Powder Company, Wilmington, Del., a corporation of Delaware No Drawing. Application November 23, 1937, Serial No. 176,106

10 Claims. (Cl. 260—89)

This invention relates to a vulcanized polymerized chloroprene containing chemically combined sulfur and to a method for the production thereof.

Polymerized chloroprene, for example, the material known to the trade as Neoprene or Duprene, is similar to rubber in characteristics and can be vulcanized in somewhat the same way. Polymerized chloroprene, however, may be vulcanized with or without the addition of elementary sulfur and without the use of the usual vulcanization accelerators. It is, however, necessary to use an activator, such as abietic acid or abietic acid containing material, such as FF wood rosin, pine tar, or mixtures thereof, and no satisfactory method of vulcanization has heretofore been developed in which a rosin containing material is not used.

Polymerized chloroprene is characterized by high resistance to swelling in various solvents notably petroleum hydrocarbon solvents, and has good aging properties. Because of these properties it has found wide use as a rubber substitute in applications in which it comes into contact with solvents, such as, petroleum hydrocarbons, or is exposed to elevated temperatures. Rosin is soluble in petroleum hydrocarbons, and for this reason, its use as an activator in vulcanized polymerized chloroprene compositions is undesirable. Furthermore, the limited number of activators as listed above, is a handicap permitting only limited variation in curing conditions. It is well recognized in the corresponding field of rubber vulcanization that, depending on the desired use, different accelerators are employed in order to obtain optimum results.

It is the object of this invention to provide a procedure for the production of a vulcanized synthetic rubber composition which is highly resistant to the swelling action of petroleum hydrocarbon solvents and which does not necessarily contain rosin or a rosin containing material.

The product in accordance with this invention will comprise a vulcanized polymerized chloroprene which contains chemically combined sulfur in the form of hydrosulfide, sulfide, or polysulfide groups. I produce this product by treating polymerized chloroprene with a sulfur containing compound, such as for example, hydrogen sulfide, ammonium hydrosulfide, sodium hydrosulfide, etc., and then subjecting the resulting compound to vulcanization preferably in admixture with various formulating ingredients commonly used in the vulcanization of polymerized chloroprene. The amount of sulfur introduced into chemical compounds with the polymerized chloroprene prior to the vulcanization treatment, in accordance with this invention, may be within the range of about 0.1% to about 5% and preferably within the range of about 0.5% to about 2.5% by weight of the polymerized chloroprene. The polymerized chloroprene which I utilize is described by U. S. Patent 1,967,863 and the applications therein mentioned and, chemically, is a polymer of chloro-2-butadiene-1-3.

The sulfur containing polymerized chloroprene which I utilize to produce the vulcanized product in accordance with this invention may be produced by the direct addition of hydrogen sulfide, to the unsaturated bonds of polymerized chloroprene, or to double bonds formed by depolymerization or rearrangement during the reaction, with the resultant formation according to the conditions of the reaction of mercaptan or sulfides, mono-mercaptans will be formed by simple combination between one molecule of hydrogen sulfide and one molecule of the polymerized chloroprene, while by the interaction of two molecules of polymerized chloroprene with hydrogen sulfide or by the reaction of the mercaptans first formed with itself or with the polymerized chloroprene present, various sulfides or thioethers may be formed. In the presence of any oxidizing agent, for example, air, the mercaptans may also be converted into di- or polysulfides. The simple addition of hydrogen sulfide to more than one double bond will result in the formation of polymercaptans.

The polymerized chloroprene may be treated with hydrogen sulfide while in solution in a suitable solvent, such as, for example, benzene, toluene, xylene, carbon tetrachloride, ethylene dichloride, etc. Alternately, it may be treated while in a slightly swollen condition by such a solvent. Again it may be treated while being masticated in a mixer, or simply in the form of a thin sheet.

The hydrogen sulfide may be passed through the polymerized chloroprene, which may be in the form of a solid, a swollen solid, a plastic solid, a liquid or a solution in a suitable solvent until the reaction is substantially completed, for example, for a period varying from 1 to 72 hours depending upon the conditions of the reaction. The use of any particular temperature is not essential to the reaction, but too low a temperature will decrease the rate of reaction unduly, while too high a temperature will cause a decomposition of the reaction product. A temperature range of from about 0° C. to about 300° C. is suitable for the reaction, although a temperature of about 20° C. to about 200° C. is preferred. The reaction will progress at any pressure, although the use of superatmospheric pressure is preferred because of the increased rate of reaction and the yield of products so obtained. The pressure may accordingly vary from about atmospheric to about 200 atmospheres, although these limits are in no way critical.

A catalyst may be employed to promote the reaction, although it will be understood that the use of a catalyst is not essential. Suitable catalysts include, for example, acids, such as, sulfuric acid, phosphoric acid, p-toluene sulfonic acid, etc.; bases, such as, potassium hydroxide, calcium hydroxide, ethanolamines, amylamines, pyridine, etc.; metallic sulfides, as ZnS, SnS, etc.; contact catalysts, such as, activated carbon, etc. A combination of catalysts, for example, phosphoric acid and silica gel, is often more effective than single catalysts.

The amount of catalyst used will depend upon the particular catalyst chosen, and will generally be based on the amount of the polymerized chloroprene present. The mineral acid and the basic catalysts will desirably be used in amount approximately equal to amount of the unsaturated high molecular weight compound present, although more or less may be used if desired. The metallic sulfides will desirably be used in amounts within the range of about 0.5% to about 50% by weight of the high molecular weight organic compound present, although it is possible to use more or less.

The mineral acid catalysts will desirably be employed in concentration of from 5 to 100%. For example, phosphoric acid may be used in concentration of from 10 to 98%. The catalyst may be added at one time or in portions from time to time during the progress of the reaction rather than in one portion at the beginning of the reaction. Acid catalysts lose much of their activity after having once been used in the reaction, but the reactivity may be restored by adding a small amount of anhydrous or concentrated acid to the spent acid. Reactivation can also be accomplished by heating the spent acid catalyst to about 80° C. to 120° C. for about an hour, cooling, and filtering through activated charcoal.

If it is desired to produce mercaptans or thioethers of the polymerized chloroprene unmixed with polysulfides, it is desirable to exclude air, or other oxidizing agents, from the reaction mass in order to avoid oxidation of the mercaptans as formed. A similar result may be accomplished by adding an antioxidant, as for example, hydroquinone, alpha naphthol, etc. to the reaction mixture. The presence of antioxidant will also tend to prevent oxidation of the mercaptan after formation and during storage, shipment, etc.

On the other hand, if it is desired to produce polysulfides, the mercaptans may be oxidized to polysulfides as they are formed by introducing air or oxygen to the reaction zone along with the hydrogen sulfide or independently.

It will be understood accordingly that all examples given for the producing of mercaptans will serve likewise for the production of the corresponding polysulfides, it being only necessary to apply oxidation to the reaction mixture, as, for example, by passing air or oxygen into it.

No special form of apparatus is required to carry out the reaction in accordance with this invention. When atmospheric pressure is used, the reaction may be carried out in an open vessel; while reaction under super-atmospheric pressure will be carried out in, for example, an autoclave.

The procedure for the treatment of polymerized chloroprene with hydrogen sulfide is more specifically illustrated by the examples which follow:

EXAMPLE I

A piece of polymerized chloroprene (Neoprene type D) about ½ inch thick weighing 100 grams was put in an autoclave of about 2 liter capacity and treated with hydrogen sulfide at a pressure of 250–300 lbs. per sq. in. for over night at room temperature. Next morning the hydrogen sulfide was let out and the autoclave opened. The treated polymerized chloroprene present had inflated to such an extent that it filled about ⅔ of the autoclave. It was left exposed to air and the gas gradually escaped, leaving the volume somewhat smaller. The free hydrogen sulfide was removed from the polymerized chloroprene by keeping it under vacuum in a desiccator containing some sodium hydroxide for several days. This treated polymerized chloroprene contained, by analysis, 1.4% sulfur. It was lighter in color than the original and more flexible and elastic.

EXAMPLE II

One hundred and ten grams of polymerized chloroprene was milled with one gram of zinc sulfide on a roll mill for a few minutes and then sheeted out into a thin sheet. It was then put into an autoclave and treated with hydrogen sulfide at a pressure of 225 lbs. per sq. inch for over night. Next morning the autoclave was opened and the treated polymerized chloroprene was found to have inflated to such an extent as to completely fill the autoclave. It was then allowed to deflate for a short time and milled to remove the free hydrogen sulfide. It was found to contain, by analysis, 1.09% combined sulfur.

EXAMPLE III

One hundred grams of a 5% solution of polymerized chloroprene (Duprene, type D SH–935) in toluol was placed in the autoclave with 75 cubic centimeters of 85% $H_3PO_4$ as a catalyst, and contacted with hydrogen sulfide under a pressure of 300 lbs. per sq. inch at room temperature for 8 hours. The product was cooled, precipitated by the addition of alcohol and dried. An analysis of this product showed it to contain 2.5% combined sulfur. The properties of the product were considerably changed from those of the original. The original polymerized chloroprene was a hard leatherlike polymer with little elasticity, while the product of the foregoing treatment was substantially more flexible and had a definite elasticity. The product had also lost the characteristic objectionable odor of the original polymerized chloroprene. The product was also of substantially improved stability as shown by the following test: Small pieces of the original polymerized chloroprene and of the product were placed in test tubes, and pieces of Congo red paper placed in the mouth of each of the test tubes and held by corks. The tubes were then placed in a bath at 90° C. At the end of 2 hours the original polymerized chloroprene had given off sufficient HCl to change the color of the Congo red paper, while 12 hours were required for my product to evolve enough HCl to change the color of the paper.

In addition to the sulfur containing polymerized chloroprene, the compositions in accordance with my invention may include rubber antioxidants, such as, phenyl-naphthylamine, as phenyl-alpha-naphthylamine (Neozone A), phenyl-beta-naphthlyamine (Neozone B); and may include reinforcing pigments, such as, carbon blacks, clay, blanc fixe, etc.; they may include fillers and/or diluents, such as, "whiting" barytes, asbestine, factice, rubber, various synthetic plastics, or rubber-like materials, balata, gutta percha, glue, etc.; they may contain softeners, such as chlorinated paraffin wax, fatty acids, oils, tars, cumar resins, etc.; and they may contain deodorants, such as, terpene compounds, etc. While as hereinbefore stated the presence of rosin or rosin-containing compounds is unnecessary to effect satisfactory vulcanization of the compounds in accordance with this invention, I may obtain special properties by including rosin-containing materials, such as, FF wood rosin, pine tar, etc. The composition in accordance with this invention may, but need not, contain added free sulfur.

My polymerized chloroprene containing chemically combined sulfur, may be vulcanized by heat with no additional ingredients present. It will be found, however, that the properties of this composition will be enhanced by compounding it with ingredients, such as those mentioned above. However, the activators need not be added.

The compositions in accordance with my invention and the characteristics thereof are more specifically illustrated by the following examples in which they are compared with prior compositions made with polymerized chloroprene not containing the chemically combined sulfur. In each of the tables, the quantities of the various ingredients are given in parts by weight, the figures representing the number of grams of each ingredient used in the particular example indicated.

In Table 1 which follows, a series of three compositions and their physical properties are given. One of these compositions is representative of a prior art vulcanized polymerized chloroprene composition, while Examples I and V are representative of products in accordance with this invention. Each of these compositions was vulcanized by treatment for sixty minutes at 288° F. (40 lbs. steam pressure).

Table 1

|  | Prior art compositions | Example No. — | |
|---|---|---|---|
|  |  | IV | V |
| Polymerized chloroprene | 112 |  |  |
| Polymerized chloroprene treated with H²S |  | 112 |  |
| Polymerized chloroprene milled with 1% ZnS treated with H²S |  |  | 112 |
| Sulfur, added as free sulfur | 0.9 | 0.9 | 0.9 |
| Light calcined magnesia | 11.2 | 11.2 | 11.2 |
| Phenyl-alpha-naphthylamine | 0.9 | 0.9 | 0.9 |
| Stearic acid | 1.9 | 1.9 | 1.9 |
| Cumaron resin (cumar S-30) | 7.6 | 7.6 | 7.6 |
| Whiting | 112 | 112 | 112 |
| Zinc oxide | 11.2 | 11.2 | 11.2 |
| Carbon black (P-33) | 93.5 | 93.5 | 93.5 |
| Pine tar | 7.6 |  |  |
| FF wood rosin | 7.6 |  |  |
| *Physical properties* |  |  |  |
| Hardness | 81 | 83 | 81 |
| Tensile strength | 1,073 | 1,193 | 1,251 |
| Percent elongation | 358 | 246 | 275 |
| Permanent set | 13 | 7.6 | 5.8 |

In the above table it will be noted that the prior art example contained both rosin and pine tar, while Examples IV and V omitted both the rosin and the pine tar. A comparison of the physical properties of Examples IV and V in accordance with this invention with example of the prior art composition given in Table 1 shows that the compositions in accordance with this invention are fully comparable to the prior art compositions even though no pine tar or FF wood rosin was used in the vulcanization. It will be noted that higher tensile strengths were obtained, and that the permanent set is lower, indicating more rubber-like characteristics, which is an advantage in some operations.

In the Examples IV and V free sulfur was utilized in the vulcanization of the compositions in accordance with this invention. Examples of compositions in accordance with this invention which contain no added sulfur as shown in Table 2, which follows:

Table 2

|  | Example No.— | |
|---|---|---|
|  | VI | VII |
| H²S treated Neoprene | 200 | 87 |
| Polymerized chloroprene |  | 87 |
| Sulfur |  |  |
| Magnesia | 20 | 17.4 |
| Phenyl-alpha-naphthylamine | 1.6 | 1.4 |
| Stearic acid | 3.4 | 3.0 |
| Cumarone resin (cumar S-30) | 13.6 | 11.8 |
| Whiting | 200.0 | 174.0 |
| Carbon black (P-33) | 166.0 | 145.0 |
| Zinc oxide | 20.0 | 17.4 |

| Physical properties | VI | | VII | |
|---|---|---|---|---|
| Time of vulcanization, minutes | 45 | 60 | 30 | 45 | 60 |
| Hardness | 84 | 85 | 78 | 79 | 81 |
| Tensile strength | 1420 | 1361 | 1398 | 1407 | 1482 |
| Percent elongation | 291 | 285 | 363 | 350 | 246 |
| Permanent set | 7.2 | 6.8 | 11.0 | 10.4 | 6.3 |

A comparison with physical properties of Examples VI and VII with those of Example IV shows that the presence of added free sulfur in the compound is unnecessary to secure satisfactory vulcanization. Example VII is of further interest in that it demonstrates that part of polymerized chloroprene treated in accordance with this invention may be replaced by untreated material, without losing the advantage of this invention. This permits still further variation in curing characteristics.

In the foregoing examples of compositions in accordance with this invention, the vulcanized chloroprene containing chemically combined sulfur was prepared by the direct addition of hydrogen sulfide to polymerized chloroprene. The chemically combined sulfur may be introduced into the polymerized chloroprene by treatment with certain metallic sulfides such as ammonium sulfides, potassium hydrosulfide, sulfides from amines, etc. as will be more specifically illustrated by the examples which follow:

EXAMPLE VIII

Five hundred grams of polymerized chloroprene were milled in a mixer of the Banbury type and 5 cubic centimeters of a 50% aqueous solution of ammonium hydrosulfide was added slowly drop by drop at intervals over a period of about 1¼ hours so as not to sufficiently wet the polymerized chloroprene at any one time to prevent the milling. Water was circulated through the jacket of the mixer during milling. The treated polymerized chloroprene after this treatment was Table 3.

EXAMPLE IX

Five hundred grams of polymerized chloroprene were milled in a mixer of the Banbury type and 3 cubic centimeters of an aqueous solution of sodium hydrosulfide containing 15.5% of the sodium sulfide were added slowly over a period of ½ hour so as not to sufficiently wet the surface of the polymerized chloroprene at any time to prevent milling. Water was circulated through the jacket of the mixer during milling. The treated polymerized chloroprene, after this treatment, was apparently dry and was compounded as given in Table 3.

Polymerized chloroprene prepared by the processes described in Example VIII and IX, respectively, were compounded in the formulas given in Table 3 and vulcanized at 288° F. for 60 minutes.

Table 3

|  | X | XI | XII |
|---|---|---|---|
| Polymerized chloroprene from Ex. VIII | 250 | 250 |  |
| Polymerized chloroprene from Ex. IX |  |  | 250 |
| Magnesia | 25 | 25 | 25 |
| Phenyl-alpha-naphthylamine (Neozone A) | 2 | 2 | 2 |
| Stearic acid | 43 | 43 | 43 |
| Cumaron resin (cumar S-30) | 17 | 17 | 17 |
| Whiting | 250 | 250 | 250 |
| Carbon black (P-33) | 208 | 208 | 208 |
| Zinc oxide | 25 | 25 | 25 |
| Sulfur |  | 2.0 |  |
| *Physical properties* |  |  |  |
| Hardness | 75 | 80 | 75 |
| Tensile strength | 1,281 | 1,175 | 1,274 |
| Elongation | 400 | 325 | 417 |
| Permanent set | 15.6 | 8.4 | 12.5 |

An inspection of the physical properties shown by Examples X and XII of the above Table 3 shows that the polymerized chloroprene containing chemically combined sulfur produced by the procedures of Examples VIII and IX, respectively, give satisfactory vulcanization without the addition of free sulfur or of an activator containing rosin. Example XI shows similar results for a compound made in accordance with this invention to which free sulfur has been added in the absence of abietic acid. However, the addition of sulfur does not appear to give any improvement.

EXAMPLE XIII

One hundred and forty grams of polymerized chloroprene and 60 grams of crepe rubber were milled together on a roll mill into a thin sheet and then treated with hydrogen sulfide at 225-250 lbs. per sq. inch pressure in an autoclave of about 2 liters capacity for about 5 hours. When the autoclave was opened the treated polymerized chloroprene-rubber mixture was inflated. It was allowed to deflate by standing. It was then compounded in the formulas Examples XIV and XV given in Table 4. The treated polymerized chloroprene-rubber mixture used in Example XVI of Table 4 was made according to the above procedure except from a 20 polymerized chloroprene to 80 rubber mixture instead of 70 polymerized chloroprene to 30 rubber.

Table 4

|  | Example— | | |
|---|---|---|---|
|  | XIV | XV | XVI |
| H₂S treated polymerized chloroprene-rubber mixture grams | 200.0 | 200.0 | 200.0 |
| Lt. calc. MgO | 20.0 | 20.0 | 20.0 |
| Stearic acid | 3.4 | 3.4 | 1.6 |
| FF rosin | 13.6 |  |  |
| Cumaron (cumar S-30) | 13.6 | 13.6 | 13.6 |
| Whiting | 200.0 | 200.0 | 200.0 |
| Carbon black (P-33) | 167.0 | 167.0 | 167.0 |
| Zinc oxide | 20.0 | 20.0 | 20.0 |
| Sulfur | 1.6 | 1.6 | 1.6 |
| Pine tar | 13.6 |  |  |
| Diphenyl guanidine |  | 3.0 | 3.0 |

The above samples were cured at 288° F.

| Physical properties | XIV | | | XV | | | XVI | | |
|---|---|---|---|---|---|---|---|---|---|
| Time of cure minutes | 30 | 60 | 90 | 30 | 60 | 90 | 45 | 60 | 60 |
| Hardness | 71 | 73 | 74 | 75 | 75 | 75 | 69 | 69 |  |
| Tensile strength | 1230 | 1414 | 1435 | 1797 | 1854 | 1854 | 991 | 911 |  |
| Elongation | 582 | 555 | 504 | 413 | 380 | 380 | 488 | 479 |  |
| Permanent set | 31.7 | 30.3 | 21.5 | 12.0 | 13.7 | 8.9 | 31.9 | 30.4 |  |

In the above examples the incorporation of rosin and pine tar as an activator is desirable on account of the presence of rubber. In the absence of the rubber, the compound would have scorched. Example XVI is of interest in that it utilized a rubber accelerator, namely diphenyl guanidine, to secure the added cure needed on account of the presence of rubber.

The overcuring or scorching of hydrogen sulfide treated polymerized chloroprene, in the presence of rosin and pine tar and in the absence of rubber, is demonstrated by the example given in Table 5 which was formulated in exactly the same manner as in Example XIV in Table 4:

Table 5

EXAMPLE XVII

| | Grams |
|---|---|
| H₂S treated Neoprene | 200.0 |
| Lt. calc. MgO | 20.0 |
| Stearic acid | 3.4 |
| FF rosin | 13.6 |
| Cumaron (cumar S-30) | 13.6 |
| Whiting | 200.0 |
| Carbon black (P-33) | 167.0 |
| Zinc oxide | 20.0 |
| Sulfur | 1.6 |
| Pine tar | 13.6 |

This sample was cured for 60 minutes at 288° F. after which it showed the following physical properties:

| | |
|---|---|
| Hardness | 92 |
| Tensile strength | 811 |
| Elongation (%) | 44 |
| Permanent set (%) | 2.7 |

An examination of the above physical properties shows clearly that the sample is overcured. Thus, the hardness is too high and the tensile strength too low for the usual vulcanization sample. Likewise, the elongation and permanent set are too low.

This application is a continuation-in-part of my application Serial No. 92,942, filed July 27, 1936.

What I claim and desire to protect by Letters Patent is:

1. A synthetic rubber composition comprising a vulcanized material from the group consisting of polymerized chloroprene hydrosulfides, polymerized chloroprene sulfides and polymerized chloroprene polysulfides.

2. A synthetic rubber composition comprising a vulcanized polymerized chloroprene hydrosulfide.

3. A synthetic rubber composition comprising a vulcanized polymerized chloroprene sulfide.

4. A synthetic rubber composition comprising a vulcanized polymerized chloroprene polysulfide.

5. A synthetic rubber composition comprising a vulcanized polymerized chloroprene polysulfide and a metal oxide of the group consisting of zinc oxide and magnesium oxide.

6. A synthetic rubber composition comprising a vulcanized compound containing a metal oxide of the group consisting of zinc oxide and magnesium oxide and a material from the group consisting of polymerized chloroprene hydrosulfides, polymerized chloroprene sulfides and polymerized chloroprene polysulfides.

7. A synthetic rubber composition comprising a vulcanized compound containing magnesium oxide and a material from the group consisting of polymerized chloroprene hydrosulfides, polymerized chloroprene sulfides and polymerized chloroprene polysulfides.

8. A method for the production of a vulcanized synthetic rubber composition which comprises reacting polymerized chloroprene with an inorganic hydrosulfide and subjecting the resulting reaction product to vulcanization.

9. A method for the production of a vulcanized synthetic rubber composition which comprises reacting polymerized chloroprene with a hydrosulfide from the group consisting of hydrogen sulfide, ammonium hydrosulfide and alkali metal hydrosulfides and then subjecting the resulting reaction product to vulcanization.

10. A method for the production of a vulcanized synthetic rubber composition which comprises reacting polymerized chloroprene with a hydrosulfide from the group consisting of hydrogen sulfide, ammonium hydrosulfide and alkali metal hydrosulfides, compounding the resulting reaction product with suitable vulcanization ingredients and subjecting the resulting compound to vulcanization.

EMIL OTT.

CERTIFICATE OF CORRECTION.

Patent No. 2,214,934. September 17, 1940.

EMIL OTT.

It is hereby certified that error appears in the printed specification of the above numbered patent requiring correction as follows: Page 3, first column, line 47, for "Examples I and V" read --Examples IV and V--; page 4, first column, line 4, after "was" insert --apparently dry and was compounded as given in--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.